(12) United States Patent
Beij et al.

(10) Patent No.: US 12,166,600 B2
(45) Date of Patent: Dec. 10, 2024

(54) DIGITAL ADDRESSABLE LIGHTING INTERFACE, DALI, ENABLED COMMUNICATION DEVICE FOR TRANSMITTING MESSAGES OVER A COMMUNICATION BUS, AS WELL AS A CORRESPONDING METHOD

(71) Applicant: SIGNIFY HOLDING B.V., Eindhoven (NL)

(72) Inventors: Marcel Beij, Sint Oedenrode (NL); Bertrand Johan Edward Hontele, Breda (NL); Eugen Jacob De Mol, Eindhoven (NL); Christian Tenhumberg, Vreden (DE)

(73) Assignee: SIGNIFY HOLDING, B.V., Eindhoven (NL)

( * ) Notice: Subject to any disclaimer, the term of this patent is extended or adjusted under 35 U.S.C. 154(b) by 567 days.

(21) Appl. No.: 17/280,737

(22) PCT Filed: Sep. 26, 2019

(86) PCT No.: PCT/EP2019/076092
§ 371 (c)(1),
(2) Date: Mar. 26, 2021

(87) PCT Pub. No.: WO2020/069980
PCT Pub. Date: Apr. 9, 2020

(65) Prior Publication Data
US 2022/0045877 A1 Feb. 10, 2022

(30) Foreign Application Priority Data
Oct. 2, 2018 (EP) .................. 18198234

(51) Int. Cl.
*H04L 12/40* (2006.01)
*H04L 12/12* (2006.01)
*H05B 47/18* (2020.01)

(52) U.S. Cl.
CPC ........ *H04L 12/40039* (2013.01); *H04L 12/12* (2013.01); *H05B 47/18* (2020.01)

(58) Field of Classification Search
CPC ... H04L 12/40039; H04L 12/12; H05B 47/18; H04B 3/548; H04B 3/542; H04B 2203/547
See application file for complete search history.

(56) References Cited

U.S. PATENT DOCUMENTS

| | | |
|---|---|---|
| 2004/0217718 A1 | 11/2004 | Kumar et al. |
| 2010/0102747 A1 | 4/2010 | Ilyes et al. |

(Continued)

FOREIGN PATENT DOCUMENTS

| | | |
|---|---|---|
| CN | 1784933 A | 6/2006 |
| CN | 104247261 A | 12/2014 |

(Continued)

*Primary Examiner* — Abdullah A Riyami
*Assistant Examiner* — Syed M Kaiser

(57) ABSTRACT

A Digital Addressable Lighting Interface, DALI, enabled communication device for transmitting messages over a communication bus having two communication lines, said device comprising a switch connected between said two communication lines, a controller arranged for controlling said switch for imposing logical communication levels on said communication bus, an energy storage device, connected in series with said switch, and arranged for storing electrical energy flowing from said bus through said switch, a bypass circuit arranged for bypassing said energy storage device when a voltage over said energy storage device is above a predetermined voltage threshold.

13 Claims, 2 Drawing Sheets

(56) References Cited

U.S. PATENT DOCUMENTS

| | | | |
|---|---|---|---|
| 2015/0250039 A1 | 9/2015 | Zulim et al. | |
| 2015/0279207 A1* | 10/2015 | Breuer | H05B 45/12 340/12.5 |
| 2016/0234918 A1 | 8/2016 | Lochmann | |
| 2017/0181240 A1 | 6/2017 | Darányi et al. | |
| 2017/0273158 A1* | 9/2017 | Csibi | H02J 7/0068 |
| 2019/0098723 A1* | 3/2019 | Sadwick | F21K 9/272 |
| 2019/0364641 A1* | 11/2019 | Bradford | H05B 45/46 |
| 2021/0307149 A1* | 9/2021 | Shi | H02J 50/80 |

FOREIGN PATENT DOCUMENTS

| | | | | |
|---|---|---|---|---|
| DE | 102013221848 A1 * | 4/2015 | | H05B 37/0254 |
| JP | S58-165435 A | 9/1983 | | |
| JP | H10-502779 A | 3/1998 | | |
| JP | 2016-534502 A | 11/2016 | | |
| WO | 2018036771 A1 | 3/2018 | | |
| WO | 2018041687 A1 | 3/2018 | | |

* cited by examiner

DIGITAL ADDRESSABLE LIGHTING INTERFACE, DALI, ENABLED COMMUNICATION DEVICE FOR TRANSMITTING MESSAGES OVER A COMMUNICATION BUS, AS WELL AS A CORRESPONDING METHOD

CROSS-REFERENCE TO PRIOR APPLICATIONS

This application is the U.S. National Phase application under 35 U.S.C. § 371 of International Application No. PCT/EP2019/076092, filed on Sep. 26, 2019, which claims the benefit of European Patent Application No. 18198234.9, filed on Oct. 2, 2018. These applications are hereby incorporated by reference herein.

BACKGROUND OF THE INVENTION

The Digital Addressable Lighting Interface, DALI, is a world-wide accepted interface in the Lighting world that controls the communication flow between Lighting Drivers/Gears, i.e. DALI Control Gears, and Lighting Controllers, i.e. DALI: Control Devices, that forms a DALI network. A minimum DALI network comprises a single Control Gear with a single Control Device but can also be expanded to multiple Control Gears and even multiple Control Devices.

By means of DALI messages, the Control Device is able to exchange data, i.e. DALI: Commands or Queries, with a single, group or all Control Gears connected to the DALI-network. The physical layer of the DALI network is build-up as a polarity dependent 2-wire connection that is powered by an external or integrated, i.e. DALI: build in a Control Gear or Control Device, power supply with a maximum voltage of 22.5V and a maximum current of 250 mA.

DALI messages are a stream of bi phase encoded digital, i.e. DALI: 1 or 0, levels. A DALI logic "1" is defined as a DALI-bus voltage above 9.5V and below 22.5V while a DALI logic "0" is defined as a DALI-bus voltage below 6.5V and above −6.5V. The DALI-bus voltage range between 6.5V and 9.5V is undefined. The minimum DALI current to setup a DALI network is set to 8 mA.

In DALI networks which contain e.g. multiple DALI Control Gears, each Control Gear has its own connection to the mains. The DALI Control Device which acts as "initiator/master" on the DALI network also needs power supply and is therefore connected to the mains by its own power supply which also acts as isolated DALI bus power supply with a minimum current of 8 mA and a maximum current of 250 mA.

A mains connection for a DALI Control Gear is logical because the DALI Control Gear also needs to generate the energy for the e.g. LED lights. The DALI Control Device on the other hand may be equipped with sensors, indicators, intelligence and other very low power devices but this power needs to be generated from the mains which is expensive, large and needs a connection to the mains.

For this reason, the DALI-SR Control Gear has been developed. This Control Gear has an integrated DALI power bus so powers the DALI network with e.g. 1 W. The maximum DALI power that is allowed on the DALI bus available is given by the physical DALI limits to 5.625 W. So, a DALI Control Device harvest its energy from the DALI bus. Unfortunately, during a DALI message the DALI bus is short-circuited and there is no power available. Because DALI messages are being build up out of bi phase bits the time the DALI-bus is short circuited during a DALI message is 50%. The maximum power that is available during a DALI message is reduced to roughly 2.8 W.

DALI timing regulations makes it a little better due to settling times and non-bi phase "stop" bits brings this back to a value close to 60%. Meaning that almost 40% of the energy is lost. When even more power is needed an extra DC bus voltage shall be applied leading to 1 or 2 extra wires/connector pins.

On the other hand, the Control Device may need a local storage device to store enough energy to survive the time the DALI bus is short circuited. This short circuit time can run up to twice the DALI baud rate time due to the bi phase coding, i.e. DALI: 834 us at a baud rate of 1200 baud.

SUMMARY OF THE INVENTION

It would be advantageous to achieve a Digital Addressable Lighting Interface, DALI, enabled communication device, i.e. a DALI Control Device, which is power efficient.

It would further be advantageous to achieve a method for operating a DALI enabled communication device like the DALI control device in such a way that power usage is improved.

To better address one or more of these concerns, in a first aspect of the present disclosure, there is presented a Digital Addressable Lighting Interface, DALI, enabled communication device for transmitting messages over a communication bus having two communication lines.

The device comprises:
- a switch connected between said two communication lines;
- a controller arranged for controlling said switch for imposing logical communication levels on said communication bus;
- an energy storage device, connected in series with said switch, and arranged for storing electrical energy flowing from said bus through said switch;
- a bypass circuit arranged for bypassing said energy storage device when a voltage over said energy storage device is above a predetermined voltage threshold.

It was one of the insights of the inventors that the communication bus does not need to be fully short circuited for conveying a logical zero over the bus. The DALI specification has set particular levels for conveying a stream of bi-phase encoded digital messages, like one's and zero's. As mentioned above, a DALI logic "1" is defined as a DALI-bus voltage above 9.5V and below 22.5V while a DALI logic "0" is defined as a DALI-bus voltage below 6.5V and above −6.5V.

Following the above, it was found that it is not necessary to fully short circuit the communication, i.e. to provide for 0 volts, as a DALI logic "0" would also be detected when the voltage at the bus is closer to 6.5 Volts.

As such, it was found to charge an energy storage device to a predetermined voltage threshold such that the short circuit current is not completely lost. The short circuit current may then be stored in the energy storage device until the voltage over the energy storage device reaches the predetermined threshold voltage. Once that voltage is reached, the bypass circuit, for bypassing the energy storage device, is activated.

One of the advantages of the present disclosure is that energy is not wasted. That is, the DALI enabled communication device is more efficient in the manner in which it tackles the available energy over the communication bus.

In an example, the bypass circuit further comprises:
a bypass switch connected in parallel over said energy storage device, wherein said controller is arranged to activate said bypass switch when said voltage over said energy storage device is above said predetermined voltage threshold.

Preferably, the bypass circuit comprises a bypass switch, such as a Field Effect Transistor, FET, switch for creating the bypass path. It is noted that the energy storage device may be connected in series with a rectifier such that, whenever the bypass circuit is activated, the electrical energy stored in the energy storage device will not leak as well via the bypass circuit. That is, the electrical energy in the energy storage device should not follow the same path via the bypass circuit.

In an example, the predetermined threshold is between 0 Volt and 6.5 Volt, preferably between 4.5 Volt and 6.5 Volt.

As mentioned above, the DALI will detect a logical zero whenever the bus voltage is between −6.5 Volt and 6.5 Volt. As such, it is preferred to set the predetermined threshold close to the 6.5 Volt. A safety margin may be maintained to make sure that the voltage does not exceed 6.5 volts.

In a further example, the DALI enabled communication device further comprises a voltage supply line and a rectifier for connecting one of said two communication lines to said voltage supply line.

The rectifier is, for example a diode. The diode is arranged to block current flowing from the voltage supply line back to the communication lines. Electrical power is, however, able to flow from the communication lines to voltage supply lines via the diode.

In another example, the controller is arranged for initiating transmitting of a message over said two communication lines by closing said switch between said two communication lines for a predetermined time.

The DALI specification defines that a message to be transmitted over the communication lines is to start with a short circuit of the communication lines for a particular amount of time, i.e. a predetermined time. The particular amount of time is, for example, a few seconds, a few microseconds or anything alike.

In a further example, the DALI enabled communication device is arranged to empower a load, and wherein energy stored in said energy storage device is used for empowering said load.

The advantage of the example is that the energy stored in the energy storage device may be effectively used. The energy is not wasted.

In a second aspect, there is provided a method of transmitting messages by a Digital Addressable Lighting Interface, DALI, enabled communication device over a communication bus having two communication lines, said device comprising a switch connected between said two communication lines, a controller arranged for controlling said switch for imposing logical communication levels on said communication bus, and an energy storage device, connected in series with said switch, and arranged for storing electrical energy flowing from said bus through said switch, and a bypass circuit arranged for bypassing said energy storage device when a voltage over said energy storage device is above a predetermined voltage threshold.

The method comprising the steps of:
imposing, by said controller, a logical zero on said communication bus such that electrical energy is flowing from said bus through said switch to said energy storage device;
bypassing, by said bypass circuit, said energy storage device when a voltage over said energy storage device is above a predetermined voltage threshold.

It is noted that the advantages and definitions as disclosed with respect to the embodiments of the first aspect of the invention also correspond to the embodiments of the second aspect of the invention, being the method of transmitting messages by a DALI enabled communication device.

In accordance with the present disclosure, the controller may be a Field Programmable Gate Array, a micro processor, or anything alike. The controller may also be implemented using analogue electronics/components.

In a further example, the bypass circuit further comprises a bypass switch connected in parallel over said energy storage device, wherein said step of bypassing comprises:
activating, by said controller, said bypass switch when said voltage over said energy storage device is above said predetermined voltage threshold.

In another example, the predetermined threshold is between 0 Volt-6.5 Volt, preferably between 4.5 Volt-6.5 Volt.

In yet another example, the DALI enabled communication device further comprises a voltage supply line and a rectifier for connecting one of said two communication lines to said voltage supply line.

In another example, the method further comprises the step of:
initiating, by said controller, a transmitting of a message over said two communication lines by closing said switch between said two communication lines for a predetermined time.

In an example, the method comprises the steps of:
empowering, by said DALI enabled communication device, a load connected to said device, wherein said empowering comprises empowering said load using energy stored in said energy storage device.

The method may be effectively performed by a suitably programmed processor or programmable controller, such as a microprocessor or microcontroller.

In a third aspect, there is provided a computer readable medium having instructions stored thereon which, when executed by a Digital Addressable Lighting Interface, DALI, enabled communication device cause said device to implement a method in accordance with any of the examples as provided above.

It is noted that the advantages and definitions as discloses with respect to the embodiments of the first and second aspects of the invention also correspond to the third aspect of the invention, being the computer readable medium.

These and other aspects of the invention will be apparent from and elucidated with reference to the embodiment(s) described hereinafter.

DETAILED DESCRIPTION

Figure 1:
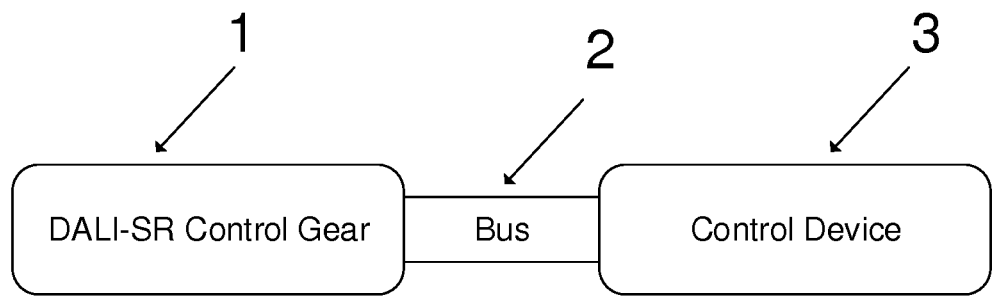
FIG. 1 discloses a DALI network consisting of a DALI control gear and a DALI control device.

FIG. 1 discloses a Digital Addressable Lighting Interface, DALI, network consisting of a DALI control gear 1 and a DALI control device 3, connected to each other via a 2-wire bus 2.

The DALI Control Gear 1 with integrated power supply, supplies the DALI bus 2 voltage and the DALI Control Device 3. The DALI Control Device 3 generates DALI messages at which the DALI-SR Control Gear can reply. Most of the DALI messages are commands such that no reply is required.

The DALI Control Device 3, typically, starts a DALI message by short-circuiting the DALI-bus 2 for a predetermined time. The present disclosure is directed to the concept that the DALI-bus does not have to be completely short-circuited, which will be explained in more detail here below.

The Control device 3 is, in accordance with the present disclosure, arranged to control the voltage at the bus 2 in such a way that the DALI control Gear 1 will perceive as if the DALI-bus is short-circuited but, in fact, the voltage over the bus 2 will not drop to zero. The voltage over the bus 2 will drop to the predetermined voltage threshold, for example 6.5 Volts.

In accordance with the DALI standard, a bus voltage below 6.5 volts will be regarded as a logical "0", i.e. a short circuit of the bus 2.

Instead of short-circuiting the DALI short circuit current may be stored in a capacitor. When this capacitor is charged to the predetermined voltage threshold, a bypass switch may be activated to flush the remaining DALI short circuit current. When the capacitor storage voltage drops, the capacitor may be recharged with the next DALI short circuit current, which will flow when the Control Device 3 starts a new DALI forward message.

Figure 2:
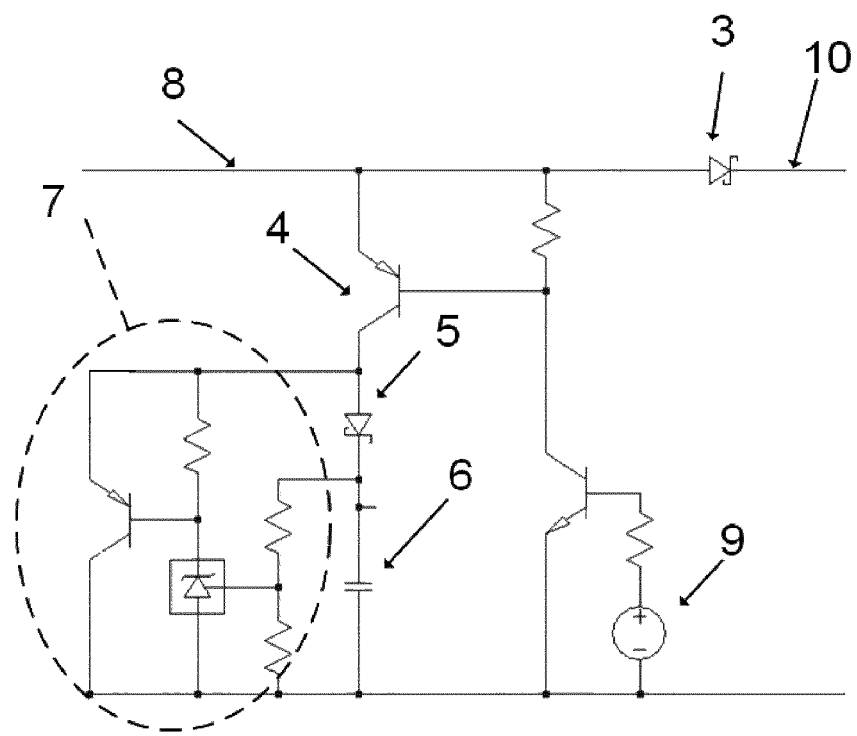
FIG. 2 shows an example of a part of an implementation of a control device 3 in accordance with the present disclosure.

The above will be described in more detail with respect to FIG. 2. FIG. 2 shows an example of a part of an implementation of a control device 3 in accordance with the present disclosure.

The Digital Addressable Lighting Interface, DALI, enabled communication device is arranged for transmitting messages over a communication bus 8 having two communication lines, of which only one is referenced with reference numeral 8. The other one is the return line at the bottom of the figure.

The DALI control device 3 comprises a switch 4 which is connected between the two communication lines, i.e. the bus 8. The DALI control device 3 further comprises a controller 9 arranged for controlling said switch 4 for imposing logical communication levels on said communication bus.

An energy storage device 6 is provided, for example a capacitor, which is connected in series with said switch, and is arranged for storing electrical energy flowing from said bus 8 through said switch 4.

The voltage between the bus 8 is thus controlled by the voltage over the capacitor 6. The voltage over the capacitor 6 equals the voltage at the bus when the switch 4 is closed.

The present disclosure is directed to a bypass circuit 7 which is arranged for bypassing said energy storage device 6 when a voltage over said energy storage device is above a predetermined voltage threshold, for example 6 volts or 6.5 volts.

A Zener diode 5 is placed in series with the capacitor 6 to ensure that the capacitor 6 is not drained when the bypass circuit 7 is activated.

Further, the control device 3 may comprise all kinds of electronica which is not shown. The electronica is placed behind the Zener diode having reference numeral 3. The supply voltage 10 of the remaining electronica is then the provided by the supply voltage 10.

Figure 3:
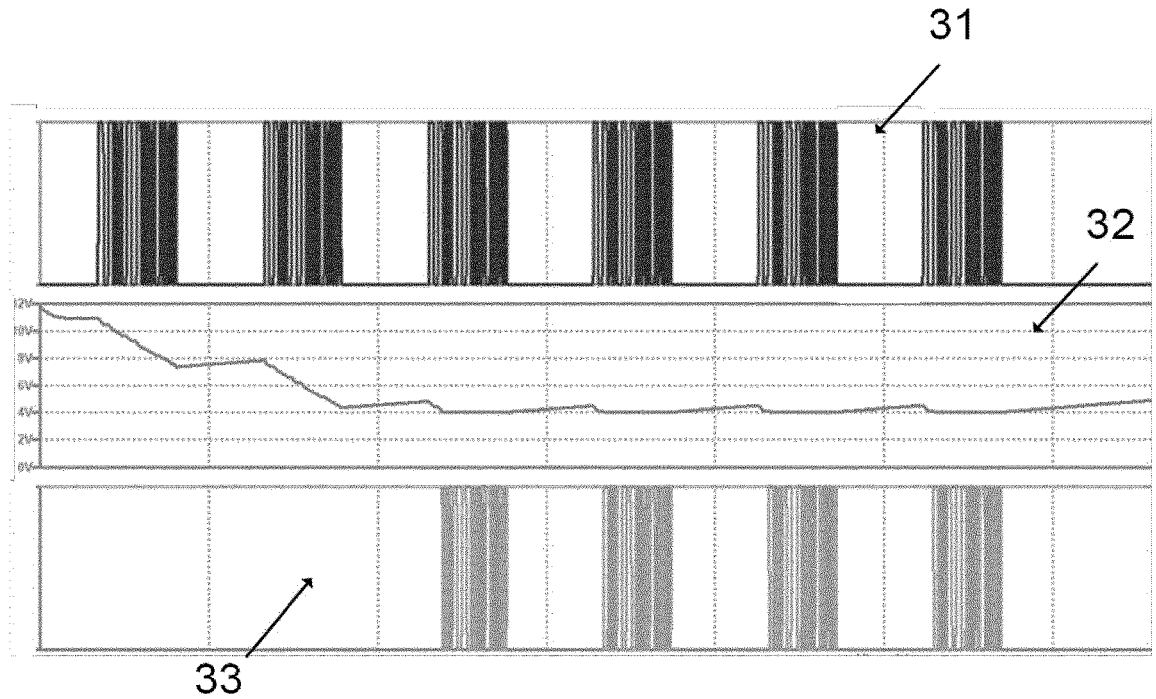
FIGS. 3 and 4 show an example of a chart in which DALI message are sent over time.

FIG. 3 shows an example of a chart in which DALI messages 31 are sent over time.

The top chart, as indicated with reference numeral 31, shows that six DALI messages are sent. As mentioned above, typically, each DALI message is initiated by short circuiting the bus for a particular amount of time. Each DALI message consists of a plurality of logical "0"'s and logical "1"'s in a particular order. A logical "0" is created from a bi-phase of a "1" and a "0" and a logical "1" is created from a bi-phase of a "0" and a "1". A "0" is created by short-circuiting the bus, a "1" is created by not amending the bus voltage at all.

The middle chart, as indicated with reference numeral 32, resembles the voltage at the supply voltage line of the DALI control device. This is the voltage that is indicated with reference numeral 10 in FIG. 2.

During communication between the DALI control device 3 and the DALI control gear 1, it is more difficult for the control device 3 to extract electrical energy from the bus, as the bus is actively controlled, i.e. short-circuited, for communication purposes.

This is also indicatively shown in the middle chart, as the voltage drops to about halve the initial voltage. The DALI control device 3 is not able to fully extract the desired electrical energy from the bus, such that the supply voltage starts to drop. The available energy gets depleted. It is noted that, typically, the control device is able to extract sufficient energy from the bus for normal communication, The present disclosure is especially suitable for situations in which the DALI enabled communication device needs to empower sensors or actuators.

The bottom chart, as indicated with reference numeral 33, indicates the lack of current drawn by the currently used powering method of the DALI control device 3. As shown, during the communication of the third, fourth, fifth and sixth message, there is not sufficient energy for the DALI control device 3 left to function properly. This may cause the DALI control device 3 to restart itself.

As mentioned above, the present disclosure provides for a solution in which the bus is not fully short-circuited. The bus voltage may be controlled to a particular predetermined voltage threshold such that energy is not completely lost. In fact, the energy stored in the capacitor may be used for empowering the DALI control device 3.

Figure 4:
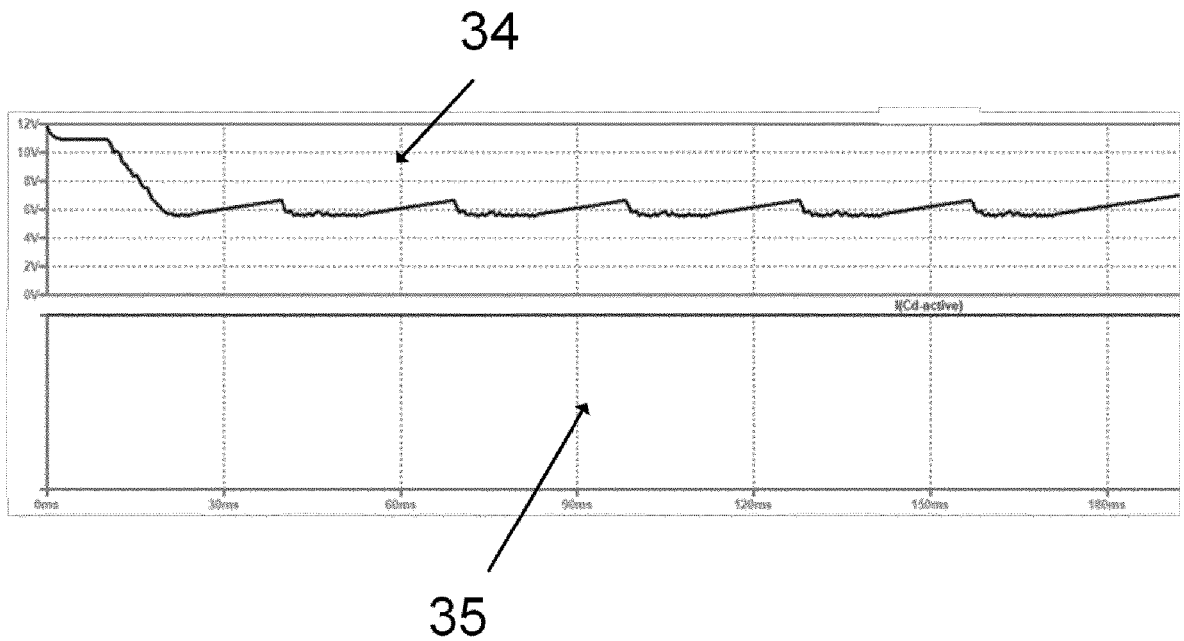

The above principle is shown in FIG. 4. The top line, as indicated with reference numeral 34, shows the decay in the supply voltage line of the DALI control device 3. This chart 34 is comparable to the graph as indicated with reference numeral 32. Here, you can see that the voltage is more or less stable during the course of the communication over the bus. There is no lack of current as indicated with reference numeral 35.

The invention described above may be used in any DALI Control Device that is powered by the DALI bus itself. The gain of available power can be increased by even 25% in case of a DALI bus input voltage of 12V at the DALI Control Device.

The invention described in the present disclosure may also be used in a DALI control gear, i.e. driver ballast. The DALI control gear does not need to short circuit the bus to "0" volt for conveying the message. It is beneficial when the DALI control gear creates a "0" by reducing the bus voltage to the predetermined voltage threshold, for example 6.5 Volts. In such a way, the efficiency of the system is improved.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope thereof.

The invention claimed is:

1. A Digital Addressable Lighting Interface, DALI, enabled communication device for transmitting messages over a communication bus having two communication lines, said device comprising:
    a switch connected between said two communication lines;
    a controller arranged for controlling said switch;
    an energy storage device, connected in series with said switch, and arranged for storing electrical energy flowing from said bus through said switch;
    a bypass circuit arranged for bypassing said energy storage device when a voltage over said energy storage device is above a predetermined voltage threshold; wherein,
    the controller is arranged for controlling said switch for imposing logical communication levels on said communication bus, and wherein said communication bus is not completely short-circuited during a logical zero.

2. A DALI enabled communication device in accordance with claim 1, wherein said bypass circuit further comprises:
    a bypass switch connected in parallel over said energy storage device, wherein said controller is arranged to activate said bypass switch when said voltage over said energy storage device is above said predetermined voltage threshold.

3. A DALI enabled communication device in accordance with any of the previous claims, wherein said predetermined threshold is between 0 Volt-6.5 Volt, preferably between 4.5 Volt-6.5 Volt.

4. A DALI enabled communication device in accordance with any of the previous claims, wherein said DALI enabled communication device further comprises a voltage supply line and a rectifier for connecting one of said two communication lines to said voltage supply line.

5. A DALI enabled communication device in accordance with claim 1, wherein said controller is arranged for initiating transmitting of a message over said two communication lines by closing said switch between said two communication lines for a predetermined time.

6. A DALI enabled communication device in accordance with claim 1, where said DALI enabled communication device is arranged to power a load, and wherein energy stored in said energy storage device is used for powering said load.

7. A method of transmitting messages by a Digital Addressable Lighting Interface, DALI, enabled communication device over a communication bus having two communication lines, said device comprising a switch connected between said two communication lines, a controller arranged for controlling said switch, and an energy storage device, connected in series with said switch, and arranged for storing electrical energy flowing from said bus through said switch, and a bypass circuit arranged for bypassing said energy storage device when a voltage over said energy storage device is above a predetermined voltage threshold, said method comprising the steps of:
    imposing, by said controller, a logical zero on said communication bus such that said communication bus is not completely short-circuited during a logical zero and electrical energy is flowing from said bus through said switch to said energy storage device;
    bypassing, by said bypass circuit, said energy storage device when a voltage over said energy storage device is above a predetermined voltage threshold; wherein,
    said controller controlling said switch for imposing logical communication levels on said communication bus.

8. A method in accordance with claim 7, wherein said bypass circuit further comprises a bypass switch connected in parallel over said energy storage device, wherein said step of bypassing comprises:
    activating, by said controller, said bypass switch when said voltage over said energy storage device is above said predetermined voltage threshold.

9. A method in accordance with claim 7, wherein said predetermined threshold is between 0 Volt-6.5 Volt, preferably between 4.5 Volt-6.5 Volt.

10. A method in accordance with claim 7, wherein said DALI enabled communication device further comprises a voltage supply line and a rectifier for connecting one of said two communication lines to said voltage supply line.

11. A method in accordance with claim 7, wherein said method further comprises the step of:
    initiating, by said controller, a transmitting of a message over said two communication lines by closing said switch between said two communication lines for a predetermined time.

12. A method in accordance with claim 7, wherein said method comprises the steps of:
    powering, by said DALI enabled communication device, a load connected to said device, wherein said powering comprises powering said load using energy stored in said energy storage device.

13. A non-transitory computer medium having instructions stored thereon which, when executed by a Digital Addressable Lighting Interface, DALI, enabled communication device cause said device to implement a method in accordance with claim 7.

* * * * *